United States Patent
Lii et al.

(10) Patent No.: US 7,688,313 B2
(45) Date of Patent: Mar. 30, 2010

(54) TOUCH-SENSE APPARATUS AVAILABLE FOR ONE-DIMENSIONAL AND TWO-DIMENSIONAL MODES AND CONTROL METHOD THEREFOR

(75) Inventors: Jia-Yih Lii, Taichung (TW); Kuan-Chun Tang, Toufen Township, Miaoli County (TW)

(73) Assignee: Elan Microelectronics Corporation, Hsinchu (TW)

( * ) Notice: Subject to any disclaimer, the term of this patent is extended or adjusted under 35 U.S.C. 154(b) by 1126 days.

(21) Appl. No.: 11/319,726

(22) Filed: Dec. 29, 2005

(65) Prior Publication Data

US 2006/0232563 A1    Oct. 19, 2006

(30) Foreign Application Priority Data

Apr. 19, 2005   (TW) .............................. 94112437 A (51) Int. Cl.
*G06F 3/041* (2006.01)
(52) U.S. Cl. ........................................ 345/173; 345/156
(58) Field of Classification Search ................. 345/156, 345/173–175, 177, 179; 178/18.01, 18.03–18.07, 178/18.09, 19.01–19.04
See application file for complete search history.

(56) References Cited

U.S. PATENT DOCUMENTS

| 6,020,878 | A  | * | 2/2000  | Robinson ..................... 345/173 |
| 6,323,846 | B1 | * | 11/2001 | Westerman et al. ......... 345/173 |
| 7,088,342 | B2 | * | 8/2006  | Rekimoto et al. ........... 345/169 |
| 2003/0076303 | A1 | * | 4/2003 | Huppi ........................ 345/163 |
| 2004/0252109 | A1 | * | 12/2004 | Trent et al. .................. 345/174 |
| 2005/0052425 | A1 | * | 3/2005 | Zadesky et al. ............. 345/173 |
| 2007/0075983 | A1 | * | 4/2007 | Chiu et al. .................. 345/173 |

* cited by examiner

*Primary Examiner*—Ricardo L Osorio
(74) *Attorney, Agent, or Firm*—Rosenberg, Klein & Lee (57) ABSTRACT

A touch-sense apparatus available for one-dimensional and two-dimensional modes comprises a sensor having a plurality of traces in two directions to sense the position touched by an object to produce a first signal, a two-dimensional coordinate processor to produce a two-dimensional coordinate based on the first signal in the two-dimensional mode, and a coordinate transformer to produce a second signal from the first signal or the two-dimensional coordinate in the one-dimensional mode for a one-dimensional coordinate processor to produce a one-dimensional coordinate in response to the second signal.

12 Claims, 8 Drawing Sheets

FIG. 9

TOUCH-SENSE APPARATUS AVAILABLE FOR ONE-DIMENSIONAL AND TWO-DIMENSIONAL MODES AND CONTROL METHOD THEREFOR

FIELD OF THE INVENTION

The present invention is related generally to a touch-sense apparatus and, more particularly, to a touch-sense apparatus and a control method therefor available for one-dimensional and two-dimensional modes.

BACKGROUND OF THE INVENTION

Figure 1A:
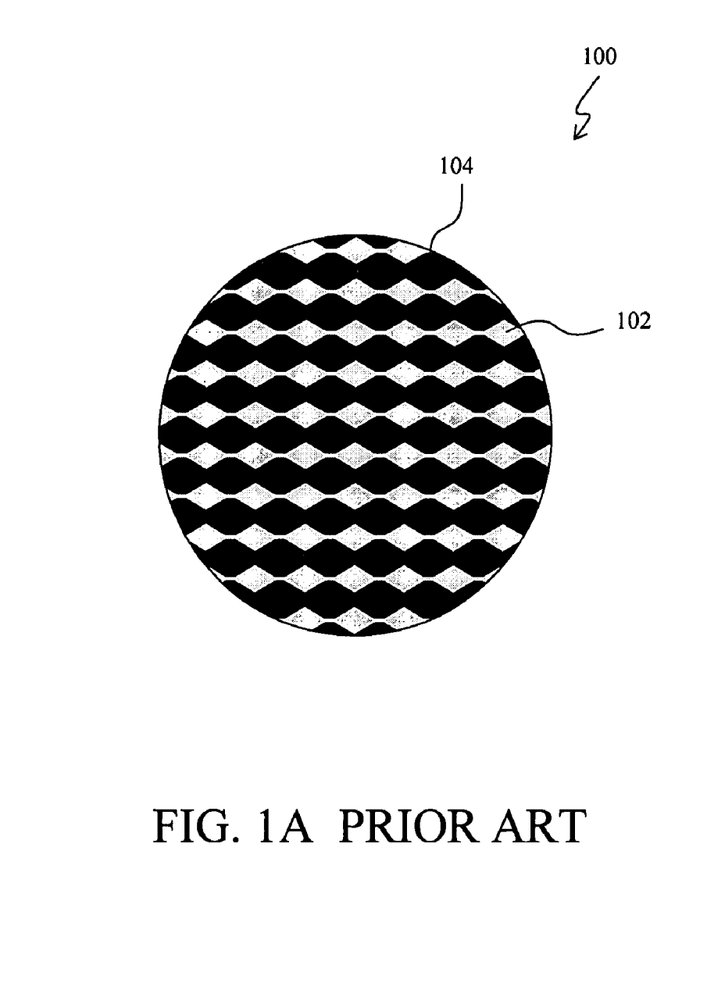
FIG. 1A shows a circle sensor of a conventional two-dimensional touchpad.
Figure 1B:
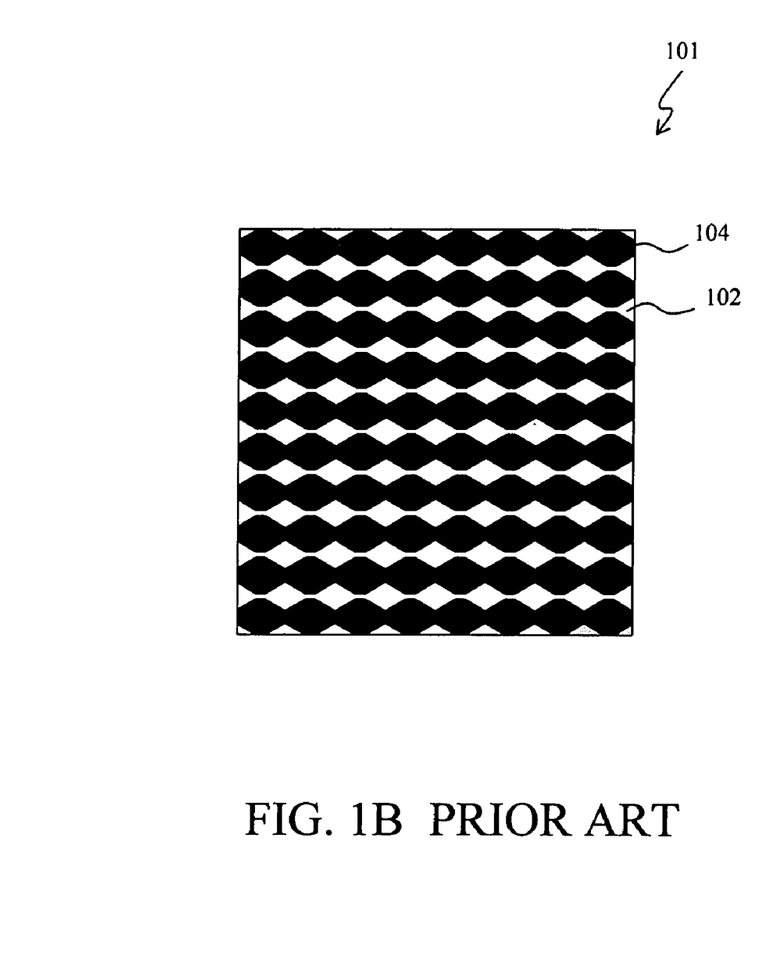
FIG. 1B shows a rectangular sensor of a conventional two-dimensional touchpad.

Recently, touchpads have been widely used in various electronic products due to their simple structure, light weight and low cost to replace conventional input apparatus. Generally, there are touchpads operated in two-dimensional mode and touchpads operated in one-dimensional mode. FIGS. 1A and 1B show two conventional sensors 100 and 101 with typical shapes for a touchpad of two-dimensional mode, each of which has a plurality of horizontal traces 102 and vertical traces 104. When a finger touches the two-dimensional touchpad, the traces 102 and 104 where is touched transfer a corresponding signal representative of the coordinate of the touched position to a host connected with the two-dimensional touchpad. The host may respond to the received signal based on the coordinate difference in the movement of the finger.

Figure 2:
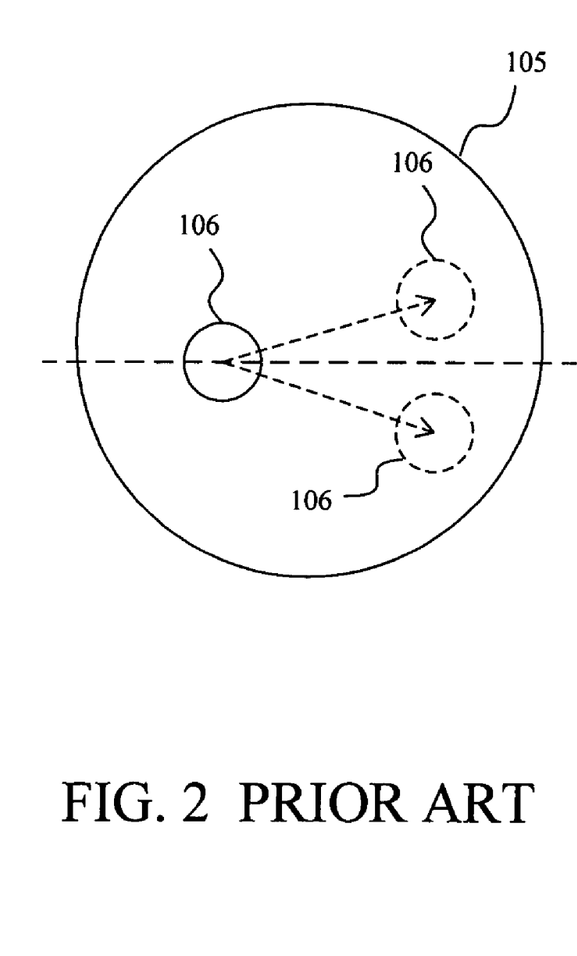
FIG. 2 is an illustration of a finger moving on a two-dimensional touchpad.

However, when a horizontal or vertical movement of the finger is desired, a two-dimensional touchpad cannot provide accurate control. For example, as shown in FIG. 2, when a horizontal scroll bar of a window is to be scrolled rightward, a finger 106 will move horizontally from left to right on a two-dimensional touchpad 105, while during the movement, the finger 106 might shift upward or downward slightly, causing the vertical scroll bar also to scroll upward or downward together with the scrolling of the horizontal scroll bar.

U.S. patent application publication No. 20040252109 provides a one-dimensional sensor for a touchpad, which senses the movement of a finger as counterclockwise or clockwise and generates a corresponding signal for the reaction in response thereto, such as upward or downward movement, left or right movement, and addition or subtraction operation. Thus, an uneven spinning degree does not affect the judgment of the instruction. Even such one-dimensional touchpad could accurately determine a positive or a negative direction, it cannot provide a multiple functions such as handwriting recognition, as a two-dimensional touchpad. If any extra function is required, an extra button or other input apparatus has to be added to the device and thus the cost is increased.

Therefore, it is desired a touch-sense apparatus available for one-dimensional and two-dimensional modes.

SUMMARY OF THE INVENTION

One object of the present invention is to provide a touch-sense apparatus capable of supporting one-dimensional and two-dimensional modes and a control method therefor.

In a touch-sense apparatus available for one-dimensional and two-dimensional modes according to the present invention, a sensor having a plurality of traces in two directions is used to sense the position touched by an object to produce a first signal, a two-dimensional coordinate processor produces a two-dimensional coordinate based on the first signal in the two-dimensional mode, and a coordinate transformer produces a second signal from the first signal or the two-dimensional coordinate in the one-dimensional mode for a one-dimensional coordinate processor to produce a one-dimensional coordinate in response to the second signal.

A touch-sense apparatus of the present invention is capable of supporting two-dimensional and one-dimensional modes, and thus obtains the advantages of the both. A user can choose two-dimensional mode or one-dimensional mode according to his need. Thus the apparatus according to the present invention could not only determine the moving direction of an object operated thereon accurately, but also provide a plurality of functions.

BRIEF DESCRIPTION OF DRAWINGS

These and other objects, features and advantages of the present invention will become apparent to those skilled in the art upon consideration of the following description of the preferred embodiment of the present invention taken in conjunction with the accompanying drawing, in which.

DETAILED DESCRIPTION OF THE INVENTION

Figure 3:
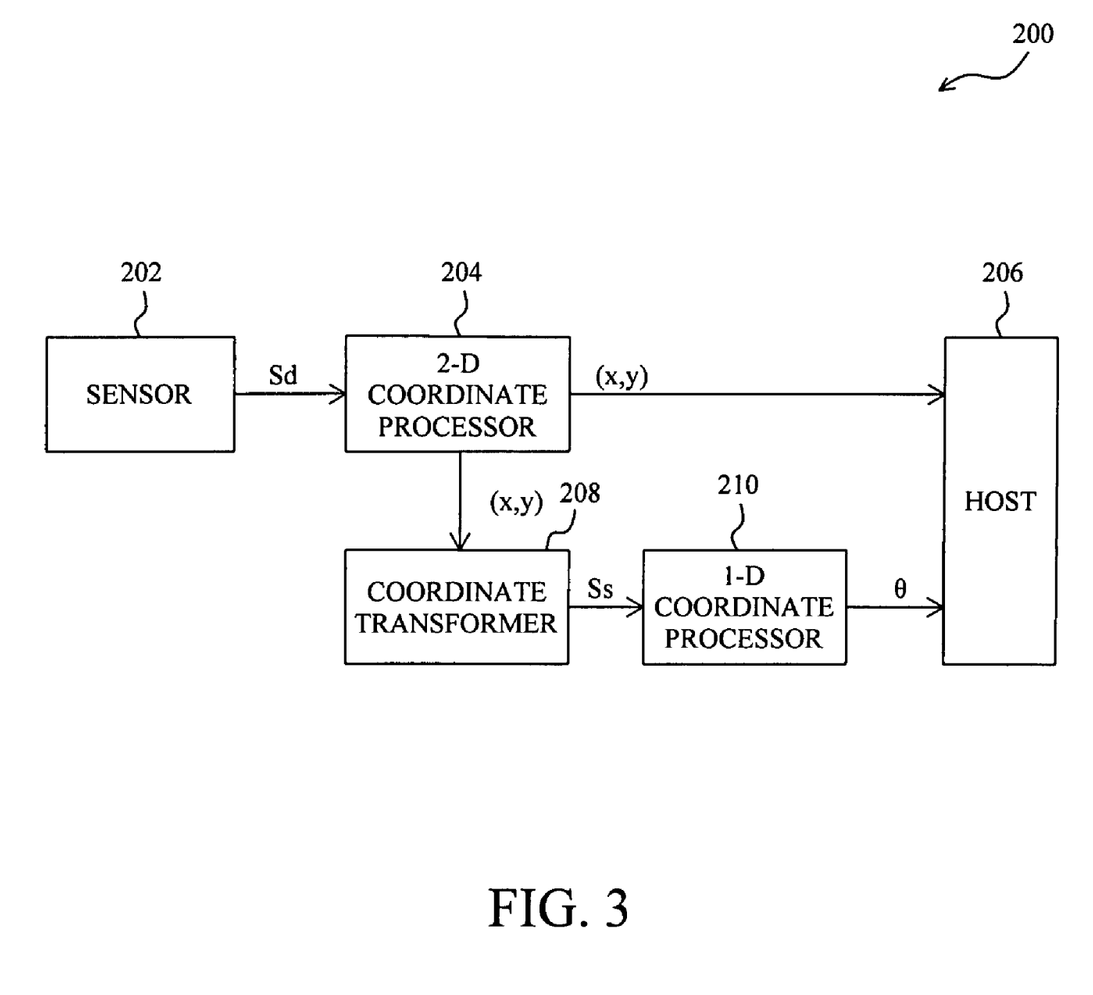
FIG. 3 shows a first functional block diagram for a touch-sense apparatus according to the present invention.
Figure 4:
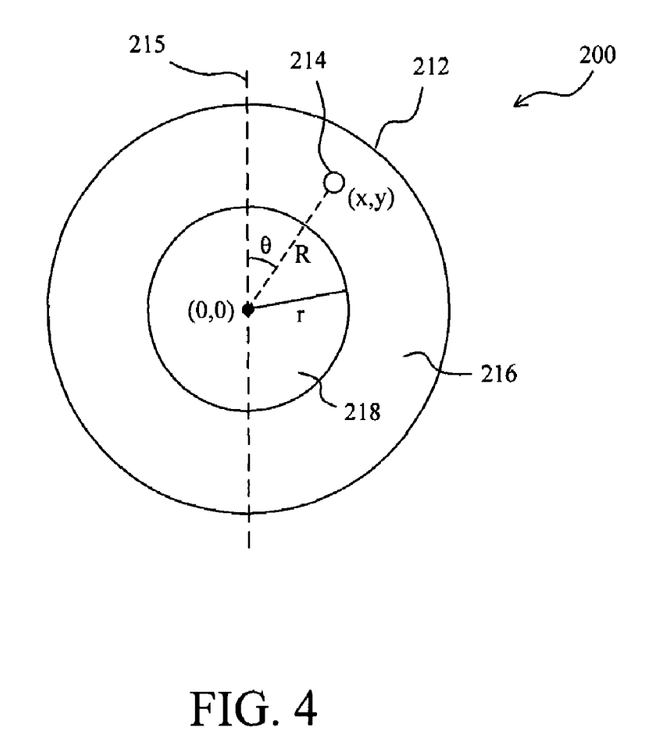
FIG. 4 shows a panel of a touch-sense apparatus according to the present invention.
Figure 5:
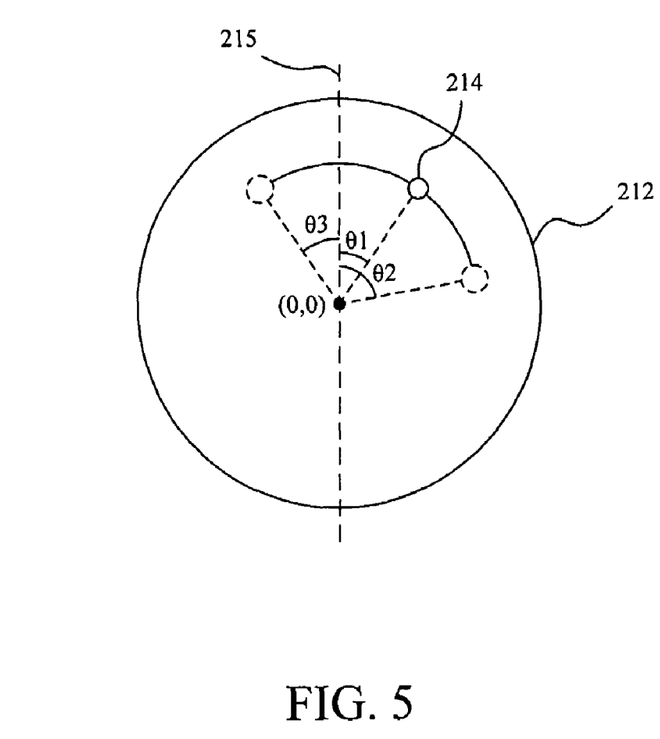
FIG. 5 is an illustration when operating on the panel of FIG. 4 in one-dimensional mode.

FIG. 3 shows a functional block diagram for a touch-sense apparatus 200 available for one-dimensional and two-dimensional modes according to the present invention, and FIG. 4 is an illustration when operating on a panel 212 of the touch-sense apparatus 200. In the touch-sense apparatus 200, a sensor 202 has a plurality of traces in two directions as shown in FIG. 1A, and when a finger 214 touches on the panel 212, the sensor 202 senses the position touched by the finger 214 to produce a two-dimensional signal Sd for a two-dimensional coordinate processor 204 to generate a two-dimensional coordinate (x,y). In two-dimensional mode, the two-dimensional coordinate (x,y) is directly sent to a host 206 connected with the touch-sense apparatus 200. The host 206 thus knows the current position of the finger 214. When the finger 214 moves on the panel 212, the two-dimensional coordinate processor 204 sends the coordinate difference in the movement to the host 206, such that the host 206 is capable of responding to the movement of the finger 214. While in one-dimensional mode, the two-dimensional coordinate (x,y) is sent to a coordinate transformer 208 to transform to a one-dimensional signal Ss, and a one-dimensional coordinate processor 210 generates a one-dimensional coordinate θ from the one-dimensional signal Ss for the host 206. In this embodiment, the one-dimensional coordinate θ includes the information of the included angle between the finger 214 and the center line 215. As shown in FIG. 5, when the finger 214 moves on the panel 212, the one-dimensional coordinate θ changes correspondingly, and the one-dimensional coordinate processor 210 produces the coordinate difference in the movement of the finger 214 for the host 206 to determine the movement of the finger 214 as clockwise or counterclockwise and to respond thereto.

Switching between the one-dimensional and two-dimensional modes may be determined by the landing position of the finger 214 on the panel 212. For example, as shown in FIG. 4, the panel 212 is defined with an outer area 216 and an inner area 218. When the finger 214 lands on the outer area 216, the touch-sense apparatus 200 is switched to the one-dimensional mode, and when the finger 214 lands on the inner area 218, the touch-sense apparatus 200 is switched to the two-dimensional mode. In this embodiment, since the outer area 216 and the inner area 218 are configured in concentric circles, the center of circle may be defined as the original point (0,0), and the coordinate of the finger 212 on the panel 212 is (x,y). Therefore, the distance between the finger 214 and the original point (0,0) is $$R=\sqrt{x^2+y^2} \quad [\text{EQ-1}]$$

Figure 6A:
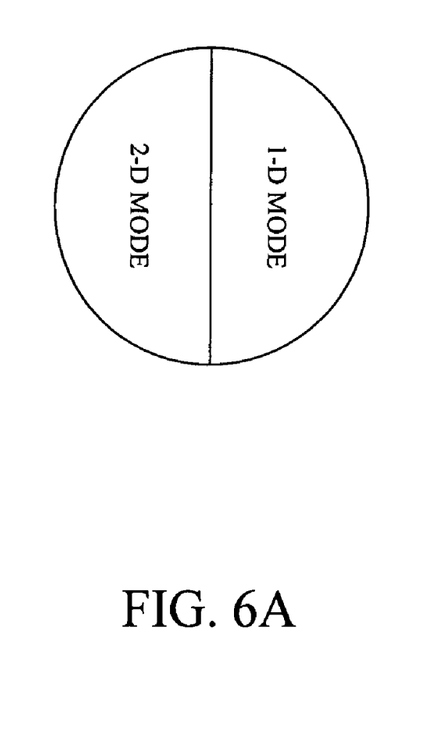
FIG. 6A shows a second operational area arrangement on a touch-sense apparatus according to the present invention.
Figure 6B:
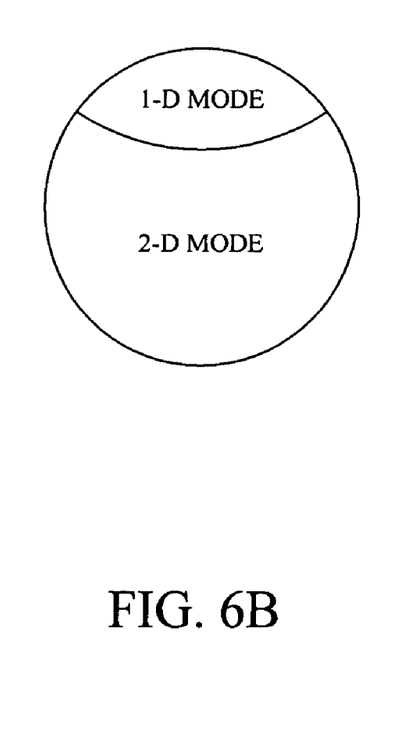
FIG. 6B shows a third operational area arrangement on a touch-sense apparatus according to the present invention.
Figure 6C:
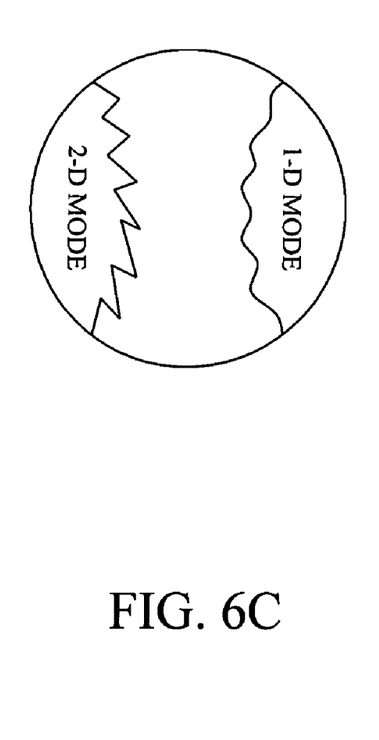
FIG. 6C shows a fourth operational area arrangement on a touch-sense apparatus according to the present invention.

If the radius of the inner area 218 is r, it is determined that the finger 214 lands on the outer area 216 when R is larger than r. Otherwise, when R is smaller than r, it is determined that the finger 214 lands on the inner area 218. In other embodiments, the panel 212 may be defined with more than two areas to determine the desired operational modes. In yet another embodiments, the shapes of the defined area on the panel 212 are irregular. FIGS. 6A, 6B and 6C are three embodiments for the defined areas on the panel 212. The shape of the panel 212 is not limited to be a circle. Other geometric shapes, such as rectangular, triangle and irregular shapes are also applicable.

Alternatively, the number of fingers landing on the panel 212 is used to switch between the one-dimensional and two-dimensional modes. For example, if there is only one finger landing on the panel 212, the touch-sense apparatus 200 is switched to the two-dimensional mode. When there are two or more fingers landing on the panel 212, the touch-sense apparatus 200 is switched to the one-dimensional mode. Moreover, the gesture may be used to switch between the two modes. For example, double clicks of a finger on the panel 212 will switch the touch-sense apparatus 200 from one mode to another.

Figure 7:
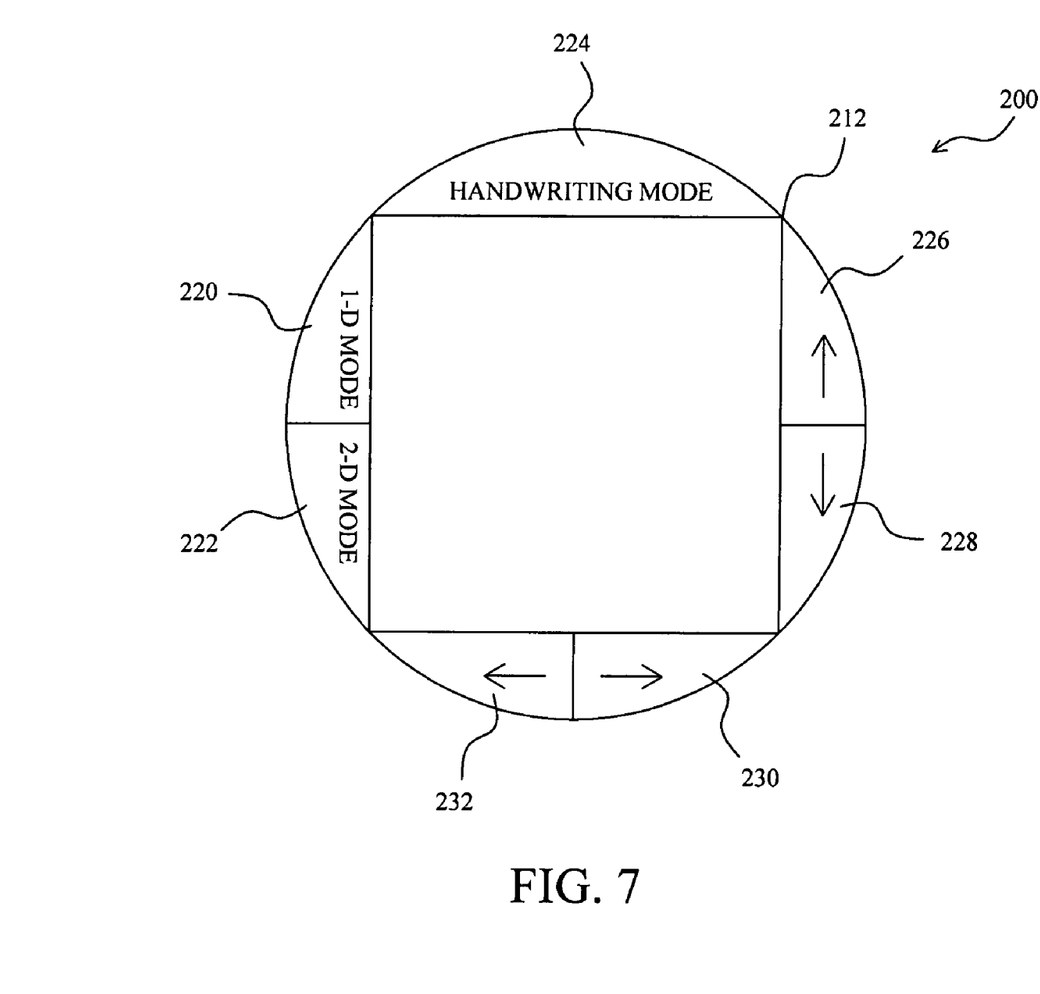
FIG. 7 shows a definition of special function areas on a touch-sense apparatus according to the present invention.
Figure 8:
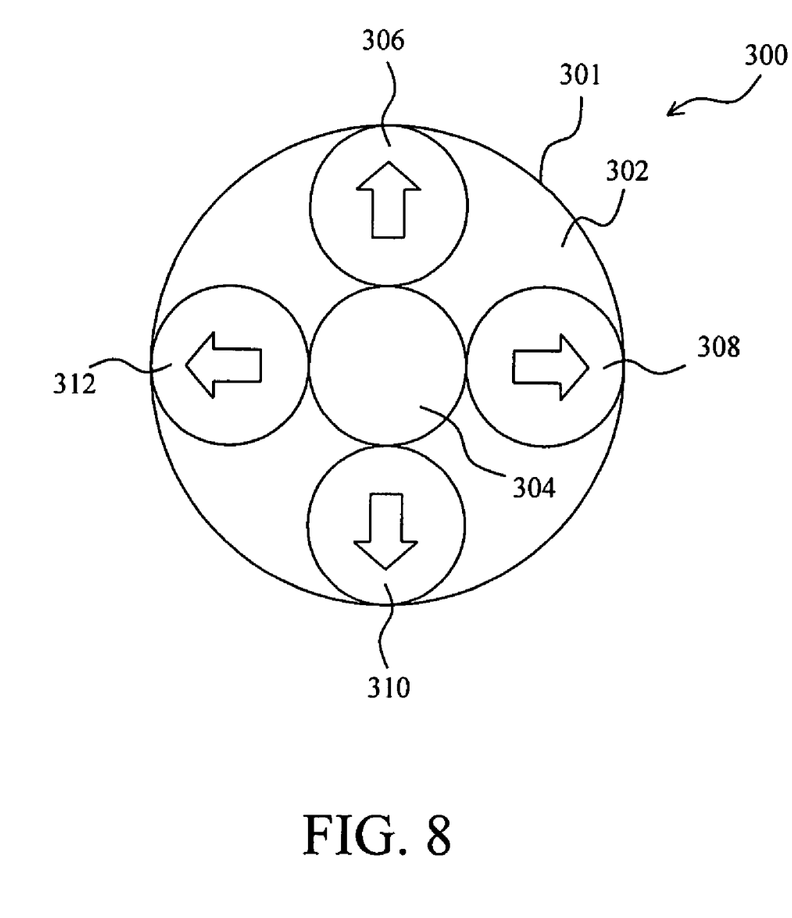
FIG. 8 shows a second definition of special function areas on a touch-sense apparatus according to the present invention.

As shown in FIG. 7, since the sensor 202 of the touch-sense apparatus 200 is a two-dimensional sensor, mode switches 220 and 222 may be defined on the touch-sense apparatus 200 to switch between the one-dimensional and two-dimensional modes. In addition, several special function areas 224, 226, 228, 230 and 232 may be defined to add extra functions. For example, the two-dimensional coordinate processor 204 can use the information of a two-dimensional coordinate (x,y) to perform handwriting recognition, and the special function area 224 is defined as the switch of handwriting mode, so that the touch-sense apparatus 200 can perform handwriting function. The special function areas 226, 228, 230 and 232 may be defined as direction keys of upward, downward, leftward and rightward. Handwriting function and defining special function areas are known in the art. The position and shape of a special function area is also selectively determined, such as those shown in FIG. 8, in which a panel 301 of a touch-sense apparatus 300 is defined with an outer concentric area 302 and an inner concentric area 304. The outer concentric area 302 is defined with four special function areas 306, 308, 310 and 312. When a finger lands on the inner concentric area 304 and then moves upward to the special function area 306, the function of upward scrolling is activated. Scrolling in different directions can be also activated in a similar way.

In the aforementioned description, the two-dimensional coordinate processor 204 outputs a two-dimensional coordinate (x,y) to the host 206 in the two-dimensional mode, and the two-dimensional coordinate (x,y) is provided for the coordinate transformer 208 in the one-dimensional mode to produce a one-dimensional coordinate θ. In other embodiments, the one-dimensional and two-dimensional modes can be activated simultaneously such that the two-dimensional coordinate processor 208 outputs a two-dimensional coordinate (x,y) to the host 206 and the coordinate transformer 210 at the same time for the one-dimensional coordinate θ and the two-dimensional coordinate (x,y) both are provided for the host 206 at the same time, and let the host 206 to determine which coordinate is needed by itself.

Figure 9:
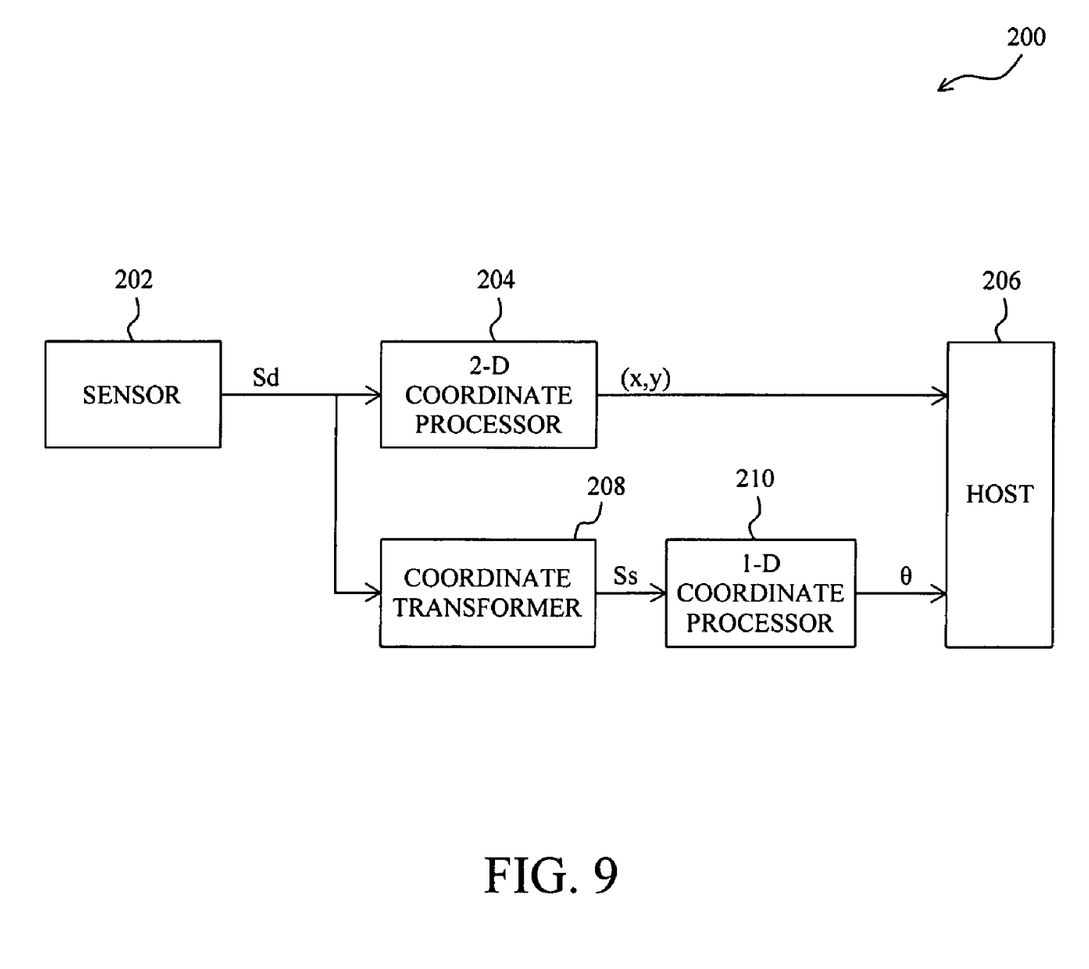
FIG. 9 shows a second functional block diagram for a touch-sense apparatus according to the present invention.

FIG. 9 shows a second functional block diagram for a touch-sense apparatus 200 capable of supporting one-dimensional and two-dimensional modes, which also comprises the sensor 202, two-dimensional coordinate processor 204, coordinate transformer 208 and one-dimensional coordinate processor 210. However, the two-dimensional signal Sd produced by the sensor 202 is sent to both of the two-dimensional coordinate processor 204 and the coordinate transformer 208. The two-dimensional coordinate processor 204 produces a two-dimensional coordinate (x,y) accordingly for the host 206, and the coordinate transformer 208 transforms the two-dimensional signal Sd to a one-dimensional signal Ss for the one-dimensional coordinate processor 210 to produce a one-dimensional coordinate θ for the host 206. The host 206 may determine if it needs the two-dimensional coordinate (x,y) or the one-dimensional coordinate θ by itself.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set fourth in the appended claims.

What is claimed is:

1. A touch-sense apparatus available for one-dimensional and two-dimensional modes, comprising: a sensor with a plurality of traces in two directions for sensing a position touched by an object on a panel of the touch-sense apparatus to generate a first signal; a two-dimensional coordinate processor for generating a two-dimensional coordinate based on the first signal in the two-dimensional mode; a coordinate transformer for generating a second signal from the first signal or the two-dimensional coordinate in the one-dimensional mode; and a one-dimensional processor for generating a one-dimensional coordinate based on the second signal.

2. The touch-sense apparatus of claim 1, wherein the one-dimensional coordinate processor produces a coordinate difference in response to the object sliding on the panel in the one-dimensional mode.

3. The touch-sense apparatus of claim 1, wherein the two-dimensional coordinate processor switches the touch-sense apparatus between the one-dimensional and two-dimensional modes according to where the object lands on the panel.

4. The touch-sense apparatus of claim 1, wherein the two-dimensional coordinate processor switches the touch-sense apparatus between the one-dimensional and two-dimensional modes according to a number of the object landing on the panel.

5. The touch-sense apparatus of claim 1, wherein the panel comprises two defined areas each for serving as a mode switch to switch the touch-sense apparatus.

6. The touch-sense apparatus of claim 5, wherein the touch-sense apparatus is switched to the one-dimensional and two-dimensional modes, respectively, when the object lands on the two defined areas.

7. The touch-sense apparatus of claim 1, wherein the two-dimensional coordinate processor has a handwriting recognition function.

8. The touch-sense apparatus of claim 1, wherein the two-dimensional coordinate processor produces a coordinate difference in response to the object sliding on the panel in the two-dimensional mode.

9. A control method for a touch-sense apparatus available for one-dimensional and two-dimensional modes, the method comprising the steps of: sensing a position touched by an object on a panel of the touch-sense apparatus for generating a first signal; generating a two-dimensional coordinate based on the first signal in the two-dimensional mode; and generating a second signal form the first signal or the two-dimensional coordinate and generating a one-dimensional coordinate based on the second signal in the one-dimensional mode.

10. The method of claim 9, further comprising the step of switching the touch-sense apparatus between the one-dimensional and two-dimensional modes according to where the object lands on the panel.

11. The method of claim 10, wherein the step of switching the touch-sense apparatus between the one-dimensional and two-dimensional modes comprises the step of determining which mode is to be switched thereto according to the object landing on a first or second area.

12. The method of claim 9, further comprising the steps of: sensing a number of the object landing on the panel; and switching the touch-sense apparatus between the one-dimensional and two-dimensional modes according the number.

* * * * *